Oct. 21, 1930.   F. W. LEIDECKER   1,779,322
CHECK VALVE
Filed Dec. 17, 1928
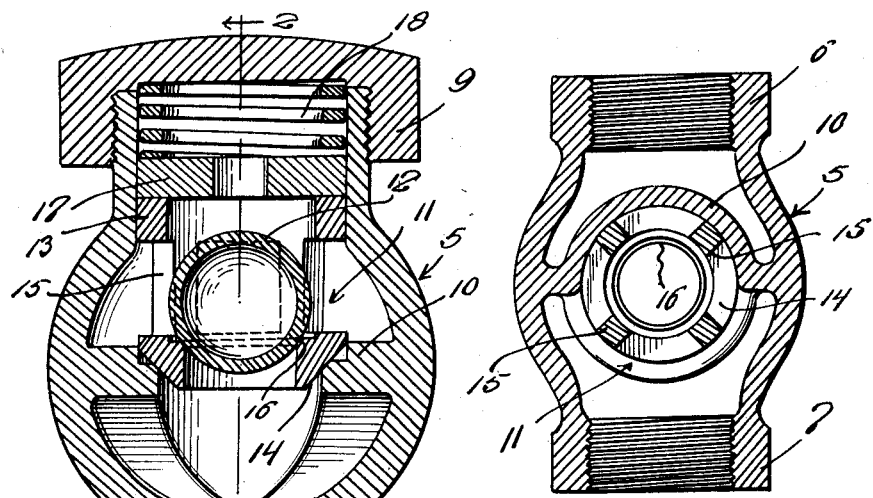
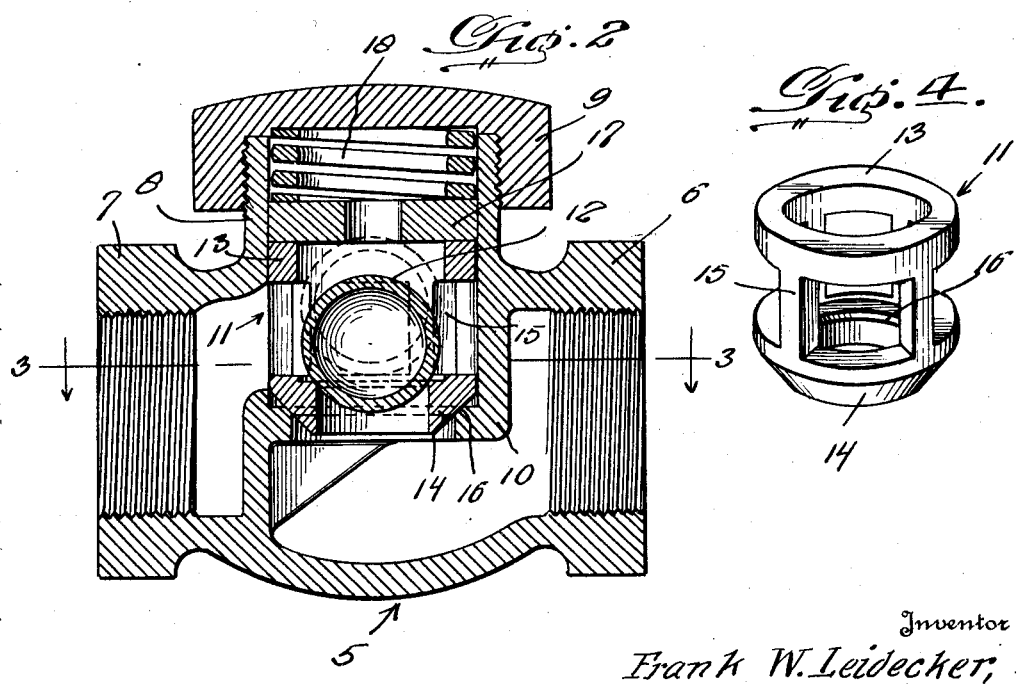
Inventor
Frank W. Leidecker,
By J. Stanley Burch
Attorney Patented Oct. 21, 1930

1,779,322

UNITED STATES PATENT OFFICE

FRANK W. LEIDECKER, OF TULSA, OKLAHOMA

CHECK VALVE

Application filed December 17, 1928. Serial No. 326,635.

This invention relates to an improved ball or disc check valve of the type especially adapted for use in high pressure fluid lines of the variety which are buried under-ground in oil field work or in or under cement floors.

Valves of this character are subject to great wear and tear and must be replaced frequently. When a check valve begins to leak it is usually necessary to replace it with an entirely new valve, an operation which amounts to considerable labor and expense, especially when the valves are buried as before stated.

The present improved valve is designed with a view to save time and labor of removing the line and the cost of replacement of valves, this being possible because of the utilization of a new organization of parts which must facilitate access and minimizes expense, time and effort in making repairs and replacements.

Briefly described, the improved valve comprises an especially designed globular body or chest, and a novel internal valve assembly, wherein the valve assembly is so made and associated with the chest as to facilitate removal, replacement, and repair.

In the drawings:

Figure 1 is a transverse vertical section taken through the center of the improved structure.

Figure 2 is a longitudinal vertical section taken approximately upon the plane of the line 2—2 of Figure 1.

Figure 3 is a horizontal sectional view on the line 3—3 of Figure 2.

Figure 4 is a perspective view of a ball check valve cage.

Referring now to the drawing by reference numerals it will be seen that the body is generally designated by the reference numeral 5 and comprises a casting formulated to provide an intake pipe connection 6 and a discharge pipe connection 7. Extending up from the top of the center is an externally screw-threaded neck 8, and a closing cap 9 is threaded on this. Closely associated with the neck is an internal diaphragm or partition 10 forming a receiving chest for the improved valve assembly. This is so made as to permit free passage of the fluid through the valve body.

The valve assembly comprises a cage 11 for the ball check valve 12. This valve may be hollow or solid whichever is desired. The cage as better shown in Figure 4 comprises an upper flat-faced annulus 13, a lower annulus 14, and connecting bars 15 spaced apart to provide for free circulation. The lower annulus 14 has a short internal bevel 16 forming a seat for the valve 12 and it has a larger external bevel seating upon a complemental portion of the partition 10 as shown in Figure 2. A washer 17 is arranged within the neck 8 and rests upon the flat surface of the annulus 13 and operates as a stop for the valve 12. Cooperating with the washer is an expansion coiled spring 18 confined within the neck and bearing at its upper end against the adjustable cap 9. This spring functions to force the washer 17 against the cage, and the cage against its seat. At the same time it provides a yieldable stop for the ball check valve 12.

In practice, the fluid enters at 6, unseats the valve 12 moving it to the dotted line position shown in Figure 2, passes on through the open-work cage and out through the discharge pipe 7. Incidentally, that portion of the fluid which is trapped in the pocket formed between the washer 17 and the cap 9 provides a desirable cushion-like stop action for the ball check valve.

I desire to emphasize the following structural features. First, I call attention to the accessibility of the separable parts of the valve assembly merely by taking off the cap 9. Secondly, it is important to note that the valve assembly is made up of readily disassembled parts so that any individual part may be replaced or repaired to minimize expense. The arrangement of the valve assembly is such as to compensate for wear. The valve is rendered practically new by removal and replacement of the valve elements and cage, at a cost of less than one-third of the cost of an entirely new check valve. Then too, this improved valve including the valve assembly can be manufactured practically for the same cost as the standard check valve now on the market. Finally, the construction has been simplified, rendered compact and convenient, and the organization of parts is such as to permit the invention to fulfill the requirements of a valve of this class in a highly satisfactory and suitable manner.

In conclusion, I deem it appropriate to also mention that the valve is highly efficient in operation in high pressure lines, is not likely to get out of order, and repairs and replacements can be made by practically unskilled persons. These and other advantages and features of the invention have doubtless been made apparent from the foregoing description and drawing. Therefore, a more lengthy description is regarded unnecessary.

Minor changes in shape, size, materials and rearrangement of details coming within the field of invention claimed may be resorted to in actual practice if desired.

I claim:

A check valve of the class described comprising a globular body including intake and discharge pipe connections at its opposite ends, a central upstanding externally screw-threaded cylindrical neck, and an internal partition having an apertured portion forming a valve seat, said partition being shaped to cooperate with said neck in forming a cylindrical valve assembly guide, a removable cap carried by said neck, a chamber therebelow, and a valve assembly in said guide comprising a cage engageable with and movable toward and from said valve seat, a ball check valve in said cage, a washer resting upon said cage and located in said neck having an opening therein for communicating with the chamber, and a spring interposed between the washer and cap within the chamber.

In testimony whereof I affix my signature.

FRANK W. LEIDECKER.